US012583324B2

(12) United States Patent
De Caen et al.

(10) Patent No.: US 12,583,324 B2
(45) Date of Patent: Mar. 24, 2026

(54) WORKING VEHICLE

(71) Applicant: J.C BAMFORD EXCAVATORS LIMITED, Uttoxeter (GB)

(72) Inventors: Stephen De Caen, Uttoxeter (GB); Jonathan Christopher Boustred, Uttoxeter (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 615 days.

(21) Appl. No.: 18/082,568

(22) Filed: Dec. 15, 2022

(65) Prior Publication Data

US 2023/0182574 A1     Jun. 15, 2023

(30) Foreign Application Priority Data

Dec. 15, 2021     (GB) ...................................... 2118182

(51) Int. Cl.
B60L 1/00          (2006.01)
B60L 7/18          (2006.01)
(Continued)

(52) U.S. Cl.
CPC ................ B60L 1/003 (2013.01); B60L 7/18 (2013.01); B60L 50/60 (2019.02); B60L 58/15 (2019.02);
(Continued)

(58) Field of Classification Search
CPC .. B60L 1/003; B60L 7/18; B60L 50/60; B60L 58/15; B60L 2200/40;
(Continued)

(56) References Cited

U.S. PATENT DOCUMENTS 6,405,114 B1 *   6/2002   Priestley ............... B66F 11/046
                                                              701/50
2010/0186404 A1 *   7/2010   Yasufuku .................. B66F 9/20
                                                              60/459
(Continued)

FOREIGN PATENT DOCUMENTS

AU         2010346508 A1     8/2012
CN          101547855 A      9/2009
(Continued)

OTHER PUBLICATIONS

Search Report issued in GB 2118182, dated May 16, 2022.
(Continued)

*Primary Examiner* — Navid Z. Mehdizadeh
*Assistant Examiner* — Shelley Marie Osterhout
(74) *Attorney, Agent, or Firm* — MARSHALL, GERSTEIN & BORUN LLP

(57)          ABSTRACT

A working vehicle includes an electric storage device; a traction motor configured to propel the working vehicle and to generate electrical energy when braking; a hydraulic system including a hydraulic pump driven by a load motor, a hydraulic actuator and a control valve; and a control system. The control system is configured to determine a state of charge of the electric storage device; induce additional load on the hydraulic system by directing the load motor to drive the hydraulic pump and actuating the control valve to direct flow of hydraulic fluid to the hydraulic actuator when the state of charge is at or above a predetermined threshold.

17 Claims, 5 Drawing Sheets

(51) Int. Cl.

| | |
|---|---|
| *B60L 50/60* | (2019.01) |
| *B60L 58/15* | (2019.01) |
| *B66F 11/04* | (2006.01) |
| *F15B 13/02* | (2006.01) |
| *F15B 15/18* | (2006.01) |

(52) U.S. Cl.

CPC ............ *B66F 11/046* (2013.01); *F15B 13/02* (2013.01); *F15B 15/18* (2013.01); *B60L 2200/40* (2013.01); *B60L 2240/54* (2013.01)

(58) Field of Classification Search

CPC .......... B60L 2240/54; B60L 7/26; B60L 7/10; B66F 11/046; B66F 17/006; F15B 13/02; F15B 15/18; B60W 2510/244; B60W 10/08; B60W 10/26; B60W 10/30; B60W 20/14; E02F 9/2083; E02F 9/2091; E02F 9/2217; H02J 7/00302; H02J 7/0048

See application file for complete search history.

(56) References Cited

U.S. PATENT DOCUMENTS

| | | | |
|---|---|---|---|
| 2011/0198141 A1* | 8/2011 | Clark | B60K 17/356 |
| | | | 180/65.265 |
| 2016/0340869 A1 | 11/2016 | Takeo | |
| 2019/0111773 A1* | 4/2019 | Nishikawa | E02F 9/2285 |
| 2022/0252086 A1* | 8/2022 | Eckhardt | B66F 17/006 |
| 2023/0077831 A1* | 3/2023 | Clark | B66F 13/00 |
| | | | 182/2.9 |

FOREIGN PATENT DOCUMENTS

| | | | |
|---|---|---|---|
| EP | 2135838 | A1 | 12/2009 |
| EP | 2626258 | A1 | 8/2013 |
| WO | WO-2014/141955 | A1 | 9/2014 |
| WO | WO-2023/043469 | A1 | 3/2023 |

OTHER PUBLICATIONS

Extended European Search Report issued in EP 22212801.9, dated May 8, 2023.

Examination Report, GB Patent Application No. GB 2118182.1, dated Apr. 7, 2025.

* cited by examiner

WORKING VEHICLE

FIELD

The present disclosure relates to a working vehicle, in particular but not exclusively to a mobile elevated work platform, and to a control system and method for controlling said working vehicle.

BACKGROUND

Various types of working vehicle are known for use in construction, agriculture, forestry or other industries. For example, mobile elevated work platforms are a type of working vehicle which allow people to work safely at height (e.g. an elevated location).

Traditionally, working vehicles have been powered by internal combustion engines. An alternative is electric or hybrid working vehicles which include an electric storage device (e.g. a battery) and electrically-driven actuation systems (e.g. electric traction motors for moving along a ground surface, and electrically driven actuators for moving a boom arrangement of the working vehicle).

In such electric or hybrid working vehicles, it is desirable to conserve as much electric energy as possible (i.e. limit the amount of power drawn from the electric storage device), to extend the working time of the working vehicle. One solution to this problem is to use electric traction motors which also function as generators, and which can be used to perform regenerative braking when the working vehicle is travelling downhill and/or reducing speed. This regenerative braking generates electrical energy, which can be used to charge the electric storage device.

In some cases, electrical energy may be generated even when the electric storage device is fully charged (e.g. when an electric or hybrid working vehicle is charged while switched off, and is then immediately driven downhill after starting the working vehicle). This excess electrical energy can lead to overcharging of the electric storage device, which can damage the electric storage device.

The present disclosure aims to overcome, or at least mitigate, one or more problems associated with the prior art.

SUMMARY

According to a first aspect of the invention, an electric or hybrid working vehicle is provided, the vehicle comprising:
- an electric storage device;
- a traction motor having a driving state, in which the traction motor is configured to propel the working vehicle using power from the electric storage device, and a regenerative braking state, in which the traction motor is configured to perform regenerative braking and generate electrical energy;
- a hydraulic system comprising a hydraulic pump, a hydraulic actuator and a control valve for controlling flow of hydraulic fluid between the hydraulic pump and the hydraulic actuator;
- a load motor configured to drive the hydraulic pump; and
- a control system;
- wherein the control system is configured to:
- determine a state of charge of the electric storage device; and
- induce additional load on the hydraulic system by directing the load motor to drive the hydraulic pump and actuating the control valve to direct flow of hydraulic fluid from the hydraulic pump to the hydraulic actuator when it is determined that an amount of charge in the electric storage device is at or above a predetermined threshold.

By dissipating excess electrical energy generated by the traction motor through the existing hydraulic system, the electric storage device is prevented from over-charging which could lead to damage of the electric storage device.

In addition, by configuring the control system to dissipate excess electrical energy via the hydraulic circuit associated with the hydraulic actuator, pump and control valve, power can be dissipated in an existing hydraulic system architecture without a need for any additional power dissipating components (e.g. separate electrical energy dissipation circuits with corresponding diverting valves).

In some embodiments, the working vehicle comprises one or more control valves for controlling flow of hydraulic fluid between the hydraulic pump and the hydraulic actuator, and the control system is configured to actuate the or each control valve to direct flow of hydraulic fluid from the hydraulic pump to the hydraulic actuator when it is determined that an amount of charge in the electric storage device is at or above the predetermined threshold.

Optionally, the control system is configured to determine an extension state of the hydraulic actuator, such that:
- when it is determined that an amount of charge in the electric storage device is at or above the predetermined threshold and that the actuator is fully extended, the control system directs the load motor to drive the hydraulic pump and actuates the control valve to direct hydraulic fluid from the hydraulic pump to urge the hydraulic actuator in an extending direction; and/or
- when it is determined that an amount of charge in the electric storage device is at or above the predetermined threshold and that the actuator is fully retracted, the control system directs the load motor to drive the hydraulic pump and actuates the control valve to direct hydraulic fluid from the hydraulic pump to urge the hydraulic actuator in a retracting direction.

It will be understood that a hydraulic actuator will be mechanically prevented from retracting beyond a fully retracted state and from extending beyond a fully extended state. Therefore, when hydraulic fluid is directed to urge a fully retracted hydraulic actuator in a retracting direction (or a fully extended hydraulic actuator in an extending direction), movement of the hydraulic actuator is mechanically prevented, which results in the pressure of hydraulic fluid being supplied to the hydraulic actuator increasing. This increase in pressure leads to an increase in temperature, which dissipates the excess electrical energy generated by the traction motor as waste heat.

Furthermore, by urging a fully retracted hydraulic actuator in a retracting direction (or a fully extended actuator in an extending direction) power dissipation can take place without any unwanted movement of an associated element of the working vehicle which is moved by the hydraulic actuator (e.g. a boom of a working arm)

Optionally, the working vehicle comprises one or more hydraulic actuators and one or more control valves for controlling flow of hydraulic fluid between the hydraulic pump and the one or more hydraulic actuators, wherein the control system is configured to determine an extension state of the or each hydraulic actuator and, when it is determined that an amount of charge in the electric storage device is at or above the predetermined threshold and that at least one hydraulic actuator is in a fully extended or fully retracted state, actuate the one or more control valves to direct hydraulic fluid to said fully extended or fully retracted hydraulic actuator(s).

By determining whether the actuator(s) is fully extended/ retracted, the working machine does not need to be put into a specific condition before power dissipation can occur (e.g. the operator does not need to lower an extendable arm of the working machine before power dissipation can occur).

Optionally, the working vehicle comprises one or more sensors to indicate the position of the one or more hydraulic actuators (e.g. limit switches, potentiometers, encoders and the like), and wherein the control system is configured to determine the extension state of the or each hydraulic actuator based on one or more signals from the one or more sensors.

Having one or more sensors provides a simple means for determining whether the actuator(s) is fully extended/re- tracted.

Optionally, the control system is configured to determine the extension state of the or each hydraulic actuator based on a history of inputs for controlling the one or more hydraulic actuators.

Determining whether the actuator(s) is fully extended/ retracted based on a history of user inputs removes the need for sensors to detect actuator states.

Optionally, the working vehicle comprises a plurality of hydraulic actuators each having a predefined pressure set- ting, wherein the control system is configured such that when it is determined that an amount of charge in the electric storage device is at or above the predetermined threshold and that more than one hydraulic actuator is in a fully retracted or extended state, the control system selects the fully retracted or extended actuator with the highest pre- defined pressure setting for dissipating electrical energy.

In other words, when it is determined that an amount of charge in the electric storage device is at or above the predetermined threshold and that more than one hydraulic actuator is in a fully retracted or extended state, the control system actuates the one or more control valves to direct hydraulic fluid to the fully retracted or extended actuator with the highest predefined pressure setting.

Dissipating electrical energy in the actuator with the highest predefined pressure setting maximizes the amount of power which can be dissipated.

Optionally, the control system is configured such that when it is determined that none of the one or more hydraulic actuators is in a fully extended or retracted state, the control system inhibits the regenerative braking state of the traction motor.

By inhibiting the regenerative braking state of the traction motor when none of the one or more actuators are fully extended/retracted (i.e. when power cannot be dissipated in the hydraulic system), overcharging of the electric storage device is avoided.

Optionally, the control system is configured to inhibit the regenerative braking state of the traction motor by restricting a drive speed of the working vehicle and/or by limiting travel of the working vehicle to slopes of 10 degrees or less, preferably 5 degrees or less.

In this way, the working vehicle avoids braking conditions in which substantial electrical energy may be generated.

Optionally, the predetermined threshold is a full-charge threshold and wherein the control system is configured such that, when it is determined that an amount of charge in the electric storage device is above a predetermined overcharge threshold greater than the predetermined full-charge thresh- old, the control system prevents movement of the working vehicle.

By preventing movement of the working vehicle (e.g. by applying a parking brake) when state of charge is greater than a predetermined overcharge threshold (e.g. a value indicating an "overcharge" of the electric storage device) the electric storage device is protected from damage associated with overcharging.

It will be understood that in such a situation the operator would be required to move one or more actuators and/or hydraulic fluid would have to be directed to a fully retracted/ extended hydraulic actuator to dissipate electrical energy from the electric storage device until the charge drops below the predetermined overcharge threshold, before the working vehicle can be driven again.

Optionally, the hydraulic system further comprises a hydraulic fluid reservoir and a pressure relief valve coupled to the hydraulic actuator, wherein the pressure relief valve is arranged to connect the hydraulic actuator to the hydraulic fluid reservoir when a pressure of the hydraulic actuator exceeds a threshold pressure of the pressure relief valve.

In this way, damage to the hydraulic system caused by excessive pressure (e.g. hose burst) is inhibited by the pressure relief valve.

Optionally, the control valve comprises a directional control valve.

Having a directional control valve allows the hydraulic actuator to be easily moved in multiple directions (e.g. extending and retracting directions) using a single valve.

Optionally, the hydraulic system comprises one or more hydraulic actuators and one or more valves for controlling flow of hydraulic fluid between the hydraulic pump and the one or more hydraulic actuators, wherein the one or more valves comprise a diverter valve, wherein the diverter valve is moveable between a bypass state in which the hydraulic pump is directly connected to the hydraulic fluid reservoir and an actuating state in which the hydraulic pump can be connected to the one or more hydraulic actuators.

It is often desirable to keep the hydraulic pump running (e.g. at idle speed) when it is not required to actuate any of the one or more hydraulic actuators, so that a fluid flow from the pump can be provided quickly when the operator begins to actuate a hydraulic actuator. It will be understood that in such an idle pump state, the diverter valve could be set to the bypass state, which would allow hydraulic fluid to flow directly to the hydraulic fluid reservoir without restriction or a rise in pressure and associated waste heat/energy loss. In other words, such a bypass state can be used to increase the efficiency of the hydraulic system.

Optionally, the hydraulic system is configured such that when a hydraulic actuator is to be actuated and/or excess electrical energy is to be dissipated, the diverter valve is set to the actuating state, and such that when no hydraulic actuator is to be actuated and no excess electrical energy is to be dissipated, the diverter valve is set to the bypass state.

In this way, when no hydraulic actuator is to be actuated and no electrical energy is to be dissipated, a flow of hydraulic fluid can pass directly to the hydraulic fluid reservoir (i.e. without passing through any other control valves or pressure relief valves) which reduces energy losses and increases the efficiency of the hydraulic system.

Optionally, a pressure relief valve is located between the diverter valve and the one or more hydraulic actuators.

In this way, damage to the hydraulic system caused by excessive pressure (e.g. hose burst) is inhibited by the pressure relief valve.

Optionally, the working vehicle is a mobile elevated work platform comprising a chassis and a basket coupled to the chassis by a boom arrangement, wherein the hydraulic system comprises one or more hydraulic actuators and wherein a position of the boom arrangement and/or basket is controlled by the one or more hydraulic actuators.

Such a working vehicle is particularly suited to dissipation of electrical energy through fully retracted hydraulic actuators, since driving conditions in which substantial electrical energy is likely to be generated (e.g. driving down steep hills or at high speed) are typically only permitted when the boom arrangement is fully retracted (and thus the hydraulic actuators are fully retracted).

Optionally, the one or more hydraulic actuators comprise a lifting actuator configured to raise the vertical height of the boom arrangement and/or an extending actuator configured to alter the length of the boom arrangement.

Such a combination of actuators provides a simple means for effecting a wide range of basket positions.

Optionally, the boom arrangement comprises an articulated boom arrangement coupled to the chassis, and wherein the one or more hydraulic actuators comprise an articulated boom lifting actuator for altering a vertical height of the articulated boom arrangement.

Optionally, the boom arrangement comprises a main boom pivotally coupled to the articulated boom arrangement, and wherein the one or more hydraulic actuators further comprise a main boom lifting actuator for altering an angle of the main boom relative to the articulated boom arrangement.

In some embodiments, the main boom is coupled to the basket.

Optionally, the main boom is telescopic, and wherein the one or more hydraulic actuators comprise an extending actuator for extending/retracting the telescopic main boom.

Optionally, the working vehicle comprises a first limit switch configured to indicate whether the telescopic main boom and/or extending actuator are fully retracted.

This first limit switch provides a simple means of indicating whether electrical energy can be dissipated through the extending actuator or not.

Optionally, the working vehicle comprises a second limit switch configured to indicate whether the articulated boom arrangement, main boom and/or respective lifting actuators are fully retracted; optionally, wherein the second limit switch is configured to indicate whether the articulated boom arrangement and/or articulated boom lifting actuator are fully retracted and the working vehicle comprises a third limit switch configured to indicate whether the main boom and/or main boom lifting actuator are fully retracted.

The second (and third) limit switches provide a simple means of indicating whether electrical energy can be dissipated through the respective lifting actuators or not.

Optionally, the control system is configured such that when it is determined that an amount of charge in the electric storage device is at or above the predetermined threshold, when at least one limit switch indicates that the respective actuator is not fully retracted, the control system restricts a drive speed of the working vehicle and/or limits travelling of the working vehicle to slopes of 10 degrees or less (e.g. 5 degrees or less).

In this way, the working vehicle avoids braking conditions in which substantial electrical energy may be generated without being able to dissipate through a fully retracted actuator.

Optionally, the boom arrangement comprises a jib boom arrangement coupled to the main boom at a first end of the jib boom arrangement and to the basket at a second end of the jib boom arrangement, and wherein the one or more hydraulic actuators further comprise a levelling actuator for pivoting the jib boom arrangement with respect to the main boom to level the basket.

Such a combination of booms and associated actuators provide a simple means for effecting a wide range of basket positions.

Furthermore, this arrangement provides a number of alternative actuators through which electrical energy can be dissipated.

According to a further aspect of the invention, a control system for an electric or hybrid working vehicle is provided, the working vehicle comprising: an electric storage device; a traction motor having a driving state, in which the traction motor is configured to propel the working vehicle using power from the electric storage device, and a regenerative braking state, in which the traction motor is configured to perform regenerative braking and generate electrical energy; a hydraulic system comprising a hydraulic pump, a hydraulic actuator and a control valve for controlling flow of hydraulic fluid between the hydraulic pump and the hydraulic actuator; a load motor configured to drive the hydraulic pump; wherein the control system is configured to:

determine a state of charge of an electric storage device of the working vehicle; and induce additional load on said hydraulic system by directing said load motor of the working vehicle to drive a hydraulic pump of the working vehicle and directing said control valve of the working vehicle to permit flow of hydraulic fluid from the hydraulic pump to a hydraulic actuator of the working vehicle when it is determined that an amount of charge in the electric storage device is at or above a predetermined threshold.

By configuring the control system to dissipate excess electrical energy in a hydraulic actuator, power can be dissipated in an existing hydraulic system architecture without a need for any additional power dissipating components (e.g. separate electrical energy dissipation circuits with corresponding diverting valves).

According to a further aspect of the invention, a method of controlling electrical energy in an electric or hybrid working vehicle is provided, the working vehicle comprising an electric storage device; a traction motor having a driving state, in which the traction motor is configured to propel the working vehicle using power from the electric storage device, and a regenerative braking state, in which the traction motor is configured to perform regenerative braking and generate electrical energy; a hydraulic system comprising a hydraulic pump, a hydraulic actuator and a control valve for controlling flow of hydraulic fluid between the hydraulic pump and the hydraulic actuator; a load motor configured to drive the hydraulic pump; the method comprising:

a) determining a state of charge of an electric storage device of the working vehicle;

b) generating electrical energy by a traction motor of the working vehicle; and c) inducing additional load on the hydraulic system by directing a load motor of the working vehicle to drive a hydraulic pump of the working vehicle and directing a control valve of the working vehicle to permit flow of hydraulic fluid from the hydraulic pump to a hydraulic actuator of the working vehicle when it is determined that an amount of charge in the electric storage device is at or above a predetermined threshold.

By dissipating excess electrical energy in a hydraulic actuator, power can be dissipated in an existing hydraulic system architecture without a need for any additional power dissipating components (e.g. separate electrical energy dissipation circuits with corresponding diverting valves).

BRIEF DESCRIPTION OF THE FIGURES

The present disclosure will now be described, by way of example, with reference to the following figures, in which.

DETAILED DESCRIPTION

Figure 1:
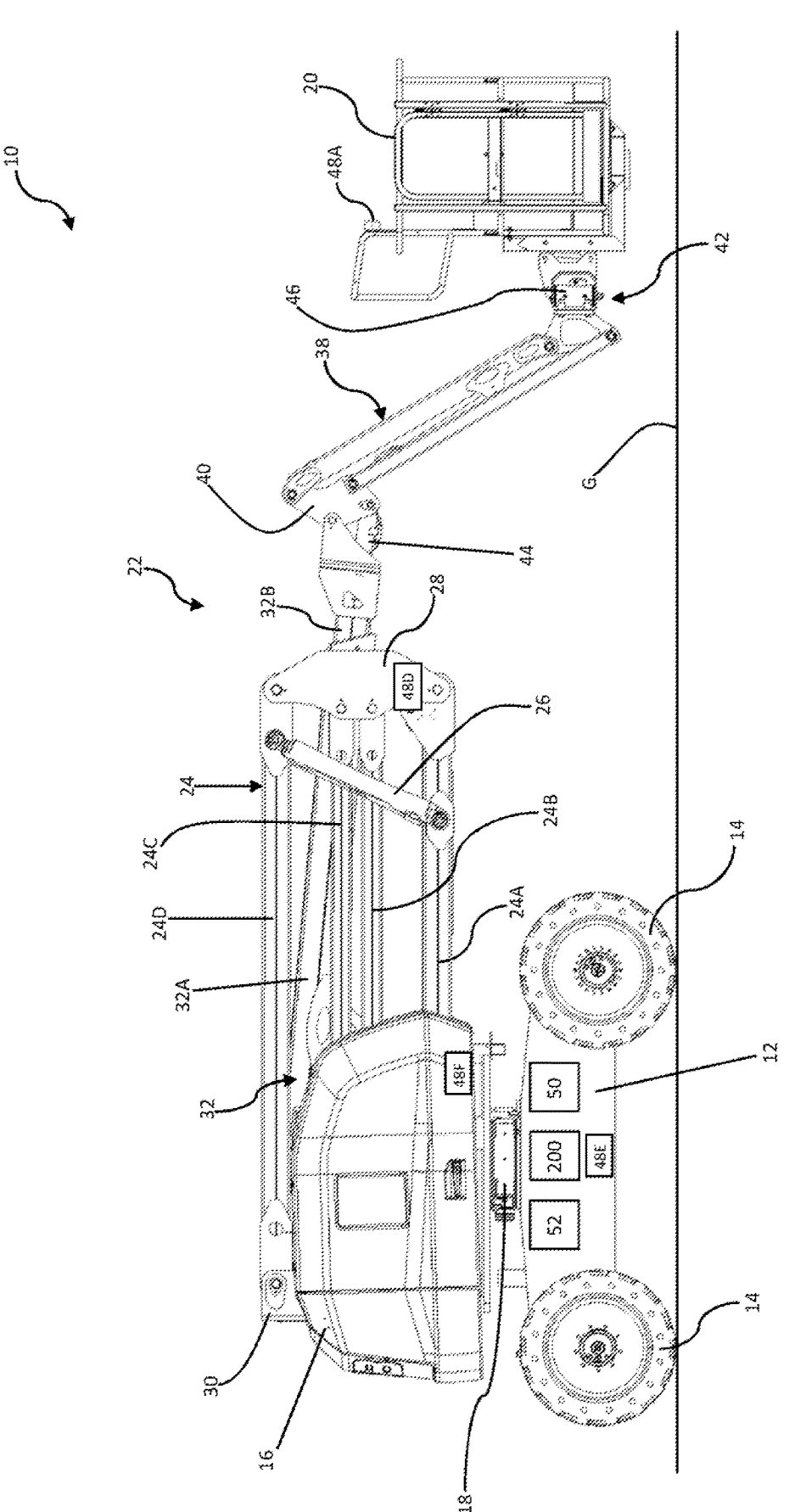
FIG. 1 is a first side view of a working vehicle according to an embodiment disclosed herein.
Figure 2:
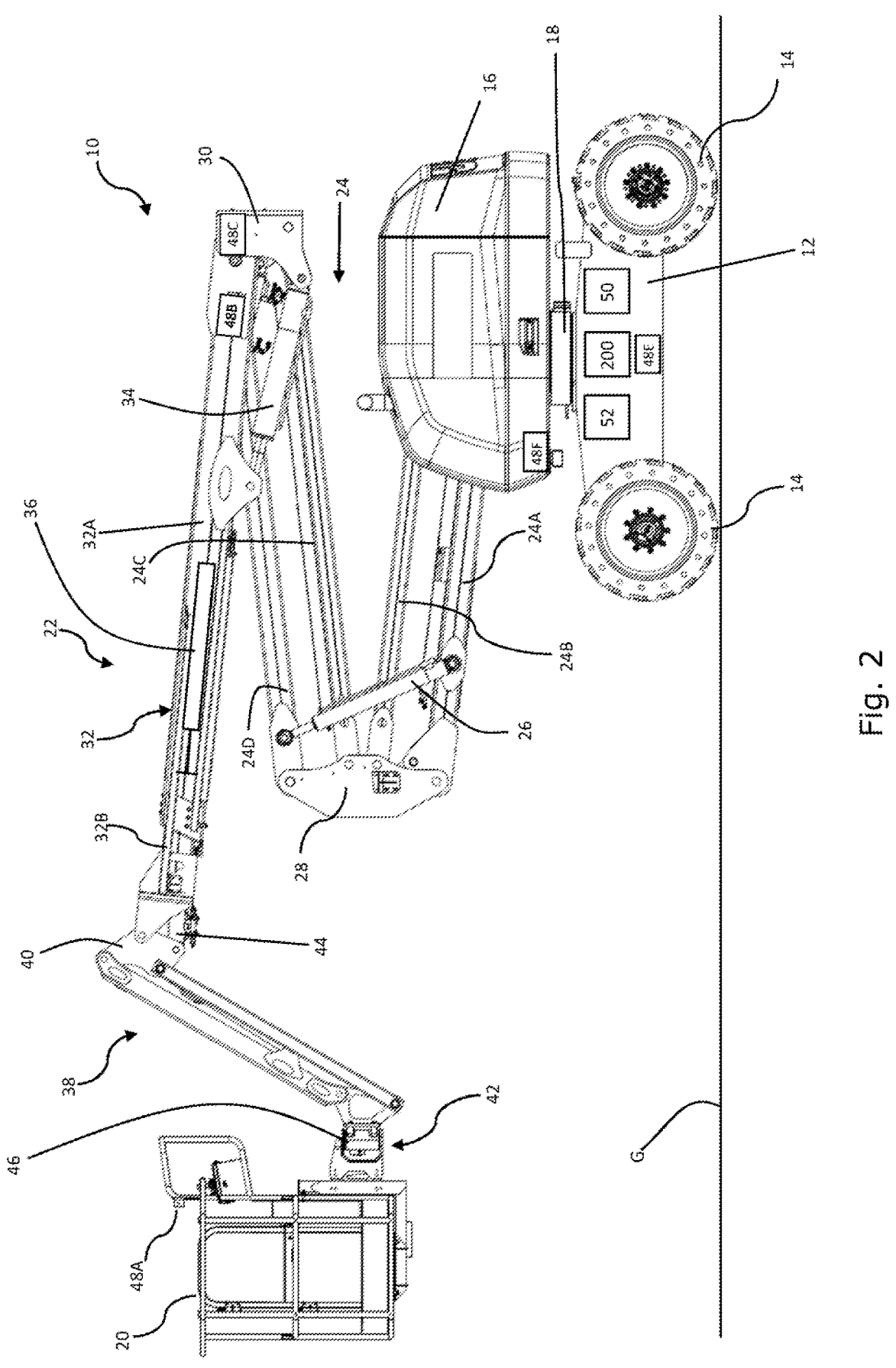
FIG. 2 is a second side view of the working vehicle of FIG. 1.

Referring firstly to FIGS. 1 and 2, a working vehicle is indicated generally at 10. In the illustrated embodiment, the working vehicle 10 is a mobile elevated work platform. In alternative embodiments, the working vehicle is a different type of working vehicle (e.g. a telehandler, a back hoe loader, an excavator, a dumper, a skid-steer loader or the like).

The working vehicle 10 includes a chassis 12 with a driving arrangement for moving the working vehicle on a ground surface G. In the illustrated embodiment, the driving arrangement includes a plurality of wheels 14 (e.g. four wheels 14). In alternative embodiments, the driving arrangement has more or less than four wheels 14, or has tracks instead of wheels.

The working vehicle 10 has a superstructure 16 rotatably coupled to the chassis 12. A slewing motor 18 (e.g. an electric or hydraulic motor) is provided for rotating the superstructure 16 relative to the chassis 12.

The working vehicle 10 also has a basket 20 which is moveable relative to the superstructure 16 via a boom arrangement 22 coupled to the superstructure 16. The basket 20 is designed for receiving one or more people and/or objects (not shown). The working vehicle 10 is configured for moving the people and/or objects in the basket 20, via actuation of the boom arrangement 22, to a location remote from the ground surface G (e.g. an elevated location).

The boom arrangement 22 has an articulated boom arrangement 24 coupled to the superstructure 16, for raising the overall height of the boom arrangement 22. The articulated boom arrangement 24 is actuated by one or more articulated boom lifting actuators 26. In particular, extension of the or each articulated boom lifting actuator 26 causes the articulated boom arrangement 24 to extend upwards, and retraction of the or each articulated boom lifting actuator 26 causes the articulated boom arrangement 24 to retract downwards.

In the illustrated embodiment, the articulated boom arrangement 24 has four booms 24A, 24B, 24C, 24D. The first and second booms 24A, 24B each have a first end pivotally coupled to the superstructure 16 and a second end pivotally coupled to a first joint 28. The third and fourth booms 24C, 24D each have a first end pivotally coupled to the first joint 28 and a second end pivotally coupled to a second joint 30.

In alternative embodiments, the articulated boom arrangement 24 has a different number of booms. For example, a single boom may replace the first and second booms 24A, 24B and a single boom may replace the third and fourth booms 24C, 24D.

It will be understood that as the articulated boom lifting actuators are extended, the four booms 24A to 24D pivot from the position shown in FIG. 1 (in which the four booms 24A to 24D are substantially parallel) to the position shown in FIG. 2 (in which they form a V-shape). In other words, in the position illustrated in FIG. 2, the first and second booms 24A, 24B are angled upwards to form a lower half of the V-shape, the first joint 28 defines a point/corner of the V-shape, and the third and fourth booms 24C, 24D are angled upwards to define an upper half of the V-shape.

The boom arrangement 22 also includes a main boom 32 having a first end pivotally coupled to the second joint 30. The main boom 32 is pivotally actuated by a main boom lifting actuator 34. In particular, extension of the main boom lifting actuator 34 causes the main boom 32 to pivot relative to the second joint 30 such that a second end of the main boom 32 is raised. The articulated boom arrangement 24 is configured so that the second joint 30 remains level regardless of the position of the four booms 24A to 24D. In this way, an angle of the main boom 32 relative to the ground surface G is not influenced by the state of the articulated boom arrangement 24.

The main boom 32 is of telescopic construction having a first portion 32A and a second portion 32B received within the first portion 32A. A main boom extension actuator 36 is provided within the main boom 32 to change the linear position of the second portion 32B relative to the first portion 32A. In other words, as the main boom extension actuator 36 is extended, the second portion 32B moved linearly outwards of the first portion 32A and thus a length of the main boom 32 is extended.

The basket 20 is coupled to a second end of the main boom 32 via a jib boom arrangement 38. The working vehicle 10 is configured so that the jib boom arrangement 38 is pivotally coupled to the basket 20 and to the main boom 32 so that the basket 20 remains substantially level regardless of the position of the main boom 32.

The jib boom arrangement 38 is connected at a first end to the main boom 32 (i.e. to an exposed end of the second portion 32B) via a knuckle 40. The jib boom arrangement 38 is connected at a second end to a basket connection arrangement 42.

The jib boom arrangement 38 is pivoted relative to the main boom 32 by a levelling actuator 44 provided between the main boom 32 and the knuckle 40. In particular, extension of the levelling actuator 44 causes the knuckle 40 to pivot in a clockwise direction (with respect to the side view of FIG. 1), thereby causing the boom arrangement 38 to also pivot in a clockwise direction. Conversely, retraction of the levelling actuator 44 causes the knuckle 40 to pivot in an anticlockwise direction (with respect to the side view of FIG. 1), thereby causing the boom arrangement 38 to also pivot in an anti-clockwise direction. It will be appreciated that extension of the levelling actuator may alternatively cause the knuckle and boom arrangement 38 to pivot in an anticlockwise direction, and that retraction of the levelling actuator may alternatively cause the knuckle and boom arrangement 38 to pivot in clockwise direction, with respect to the side view of FIG. 1.

The basket connecting arrangement 42 is configured such that when the jib boom arrangement 38 is pivoted relative to the main boom 32 by the levelling actuator 44, the basket 20 pivots by a corresponding amount relative to the jib boom arrangement 38. In this way, a pivotal angle of the basket 20 relative to the main boom 32, and thus a pivotal angle of the basket 20 relative to the ground surface G, can be controlled by the levelling actuator 44.

In the illustrated embodiment, the basket connecting arrangement 42 also has a rotary actuator 46 which allows side-to-side pivoting of the basket 20 relative to the jib boom arrangement 38 (i.e. about a substantially vertical axis).

In alternative embodiments, the working vehicle 10 has a different type of boom arrangement 22. For example: the main boom 32 may be connected directly to the basket 20 (i.e. the jib boom arrangement 38 may be omitted); the main boom 32 may be connected directly to the superstructure 16 (i.e. the articulated boom arrangement 24 may be omitted); the articulated boom arrangement 24 may be a scissor-type arrangement; and/or the main boom 32 may not be telescopic.

In some embodiments, the position of the basket 20 relative to the ground surface G is controlled via one or more user controls 48A located on the basket 20, and/or on the superstructure 16, and/or on a remote control device (not shown). The one or more user controls 48A can also be used to control travelling of the working vehicle 10 along the ground surface G (i.e. to control movement of the wheels 14).

As will be described in more detail below, certain operations of the working vehicle 10 are limited or carried out depending on the position of the boom arrangement 22. In order to determine the position of the boom arrangement 22, a plurality of sensors are provided. In particular, the working vehicle 10 has a first limit switch 48B configured to indicate whether the telescopic main boom 32 is fully retracted, a second limit switch 48C configured to indicate whether the main boom 32 and respective lifting actuator 34 are fully retracted and a third limit switch 48D configured to indicate whether the articulated boom arrangement 24 and respective lifting actuator 26 are fully retracted. Signals from the first, second and third limit switches 48B, 48C, 48D are used by a control system 200 of the working vehicle 10, as described in more detail below.

As will also be described in more detail below, the working vehicle 10 may be limited in certain conditions from driving along the ground surface G above a certain speed or from driving along slopes of the ground surface G above a certain inclination angle. Therefore, the working vehicle 10 has a speed sensor 48E for indicating a travelling speed of the working vehicle 10 relative to the ground surface G, and an inclination sensor 48F for indicating an inclination angle of the working vehicle 10 relative to a horizontal plane (and thus an inclination angle of the ground surface G on which the working vehicle 10 is located). In alternative embodiments, the speed sensor 48E is omitted and a speed of the working vehicle 10 is instead determined from a history of inputs applied to the user controls 48A. In alternative embodiments, the inclination sensor 48F is omitted (e.g. the working vehicle 10 may not be controlled depending on particular inclination angles of the ground surface G).

The working vehicle 10 is an electric or hybrid working vehicle having an electric storage device 50 as a source of power. The working vehicle 10 also includes a traction motor 52 having a driving state, in which the traction motor 52 is configured to propel the working vehicle 10 using power from the electric storage device 50 (i.e. by driving the wheels 14), and a regenerative braking state, in which the traction motor 52 is configured to perform regenerative braking and generate electrical energy. In some embodiments, the working vehicle 10 has a plurality of traction motors 52 (e.g. a traction motor 52 for each wheel axle, or a traction motor 52 for each wheel 14).

In the illustrated embodiment, the speed and inclination sensors 48E, 48F, the electric storage device 50 and the traction motor 52 are shown schematically in the chassis 12 of the working vehicle 10, along with the control system 200. In alternative embodiments, the electric storage device 50, traction motor 52 and/or control system 200 are located in the superstructure 16 or elsewhere on the working vehicle 10.

In the illustrated embodiment, the articulated boom lifting actuators 26, main boom lifting actuator 34, main boom extension actuator 36 are hydraulic actuators driven by a hydraulic system 100. In some embodiments, the levelling actuator 44 is also a hydraulic actuator driven by the hydraulic system 100.

Figure 3:
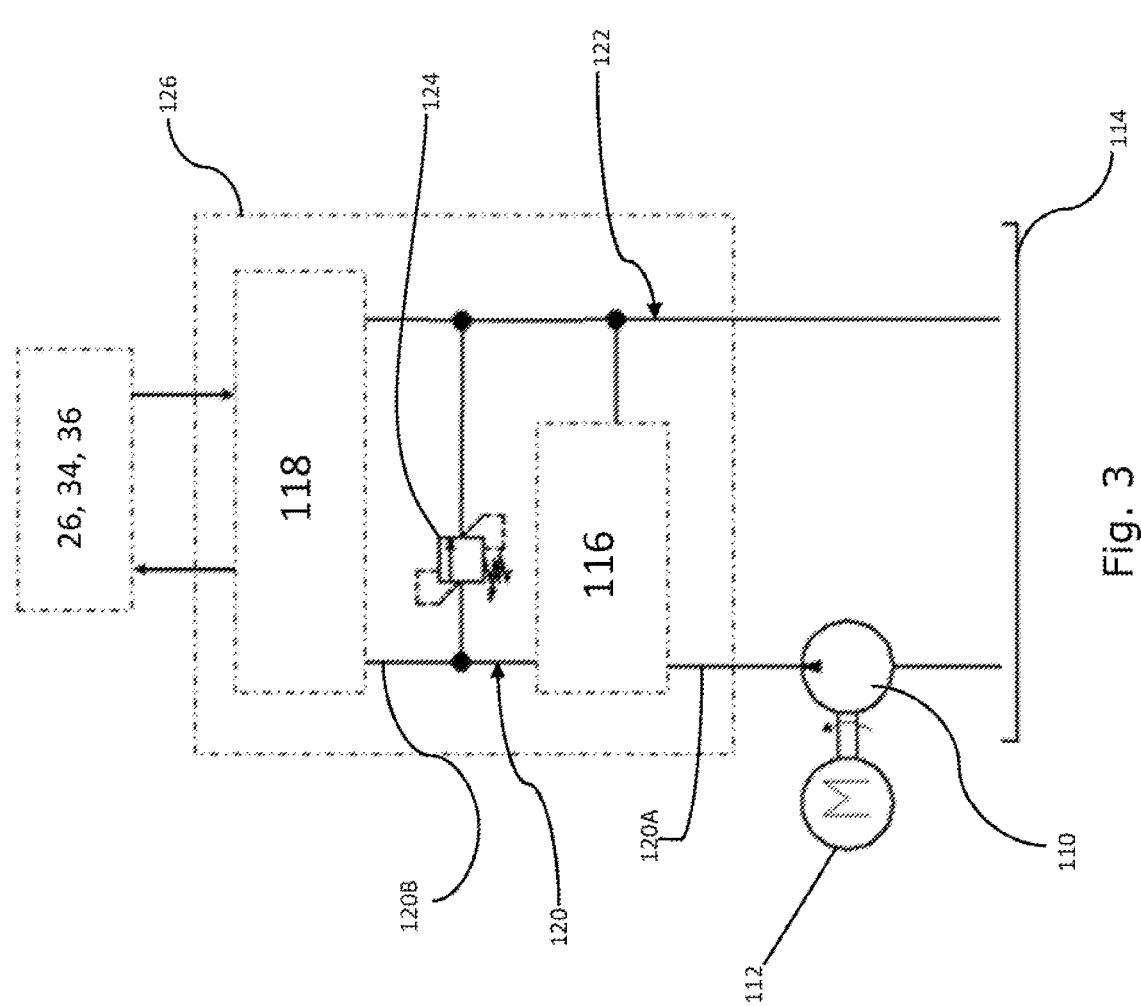
FIG. 3 is a schematic of the hydraulic system of the working vehicle of FIGS. 1 and 2 according to an embodiment.

As illustrated in FIG. 3, the hydraulic system 100 has a hydraulic pump 110 which is driven by a load motor 112 of the working vehicle 10. In the illustrated embodiment, the hydraulic system 100 is an open-circuit system. In other words, the hydraulic pump 110 supplies fluid from a hydraulic fluid reservoir 114 to the downstream components of the hydraulic system 100 (e.g. to hydraulic actuators 26, 34, 36 or to the valves 116, 118 or pressure relief valve 124 described below), and a return flow from these downstream components (e.g. from hydraulic actuators 26, 34, 36 or from the valves 116, 118 or pressure relief valve 124 described below) is directed back to the reservoir 114.

As will be described in more detail below, the hydraulic system 100 has a plurality of valves 116, 118 for controlling flow of hydraulic fluid between the hydraulic pump 110 and the hydraulic actuators 26, 34, 36.

The hydraulic system 100 has fluid supply path 120 which runs from the hydraulic pump 110 to the valves 116, 118, and a fluid return path 122 which runs from the valves 116, 118 to the hydraulic fluid reservoir 114.

A diverter valve 116 is provided in the fluid supply path 120. The diverter valve 116 splits the fluid supply path into an upstream portion 120A and a downstream portion 120B. The diverter valve 116 has a bypass state in which the hydraulic pump 110 is directly connected to the hydraulic fluid reservoir 112 (i.e. in which the upstream portion 120A of the fluid supply path 120 is directly connected to the fluid return path 122). The diverter valve 116 also has an actuating state in which the hydraulic pump 110 can be connected to one or more of the hydraulic actuators 26, 34, 36 (i.e. in which the upstream portion 120A is connected to the downstream portion 120B of the fluid path 120). It will be understood that in the actuating state, the upstream portion 120A of the fluid supply path 120 is not directly connected to the fluid return path 122 as it is in the bypass state, so that all fluid flow along the upstream portion 120A flows to the downstream portion 120B of the fluid supply path 120.

It is often desirable to keep the hydraulic pump 110 running (e.g. at idle speed) when it is not required to actuate any of the hydraulic actuators 26, 34, 36, so that a flow of fluid along the fluid supply line 120 can be provided quickly when an operator begins to actuate a hydraulic actuator 26, 34, 36. It will be understood that in such an idle state of the hydraulic pump 110, the diverter valve 116 could be set to the bypass state, which would allow hydraulic fluid to flow directly to the hydraulic fluid reservoir 114 without restriction or a rise in pressure and associated waste heat/energy loss. In other words, such a bypass state can be used to increase the efficiency of the hydraulic system 100.

Therefore, to provide an efficient hydraulic system 100, the diverter valve 116 is automatically set to the actuating state (e.g. by hydraulic pressure control) when one or more control valves in the downstream portion 120B of the fluid path 120 are activated (e.g. when the directional control valves of the directional control block 118 described below are not closed), and is automatically set to the bypass state otherwise.

In alternative embodiments, the state of the diverter valve 116 is set by the control system 200.

In alternative embodiments, the diverter valve 116 is omitted. In such embodiments, flow from the hydraulic pump 110 at idle speed can be returned to the hydraulic fluid reservoir 114 by a pressure relief valve between the fluid supply path 120 and the fluid return path 122 (e.g. the pressure relief valve 124 described below).

A directional control valve block 118 including a plurality of directional control valves is provided at a downstream end of the fluid supply path 120 (i.e. downstream of the diverter valve 116). The directional control valve block 118 is configured to direct hydraulic fluid from the fluid supply path 120 to the hydraulic actuators 26, 34, 36 as required (e.g. to drive the hydraulic actuators 26, 34, 36 in extending/retracting directions as required). In some embodiments, the directional control valves of the directional control valve block 118 are proportional valves (e.g. proportional spool valves).

A pressure relief valve 124 is located between the fluid supply path 120 and the fluid return path 122. The pressure relief valve 124 is arranged to connect one or more of the hydraulic actuators 26, 34, 36 to the hydraulic fluid reservoir 114 when a pressure of said one or more hydraulic actuators 26, 34, 36 exceeds a threshold pressure of the pressure relief valve 124. In this way, damage to the hydraulic system 100 caused by excessive pressure (e.g. hose burst) is inhibited by the pressure relief valve 124.

In the illustrated embodiment, the pressure relief valve 124 is located between the diverter valve 116 and the hydraulic actuators 26, 34, 36. In particular, the pressure relief valve 124 is located between the diverter valve 116 and the directional control valve block 118. In alternative embodiments, the pressure relief valve 124 is provided within the directional control valve block 118. In alternative embodiments, a plurality of pressure relief valves 124 are provided downstream of the directional control valve block 118 (e.g. one pressure relief valve 124 in each flow path to/from the actuators 26, 34, 36).

In the illustrated embodiment, the diverter valve 116, directional control valve block 118 and pressure relief valve 124 are provided in a single valve block 126. In alternative embodiments, the diverter valve 116, directional control valve block 118 and pressure relief valve 124 are provided as separate valve blocks or components.

Figure 4:
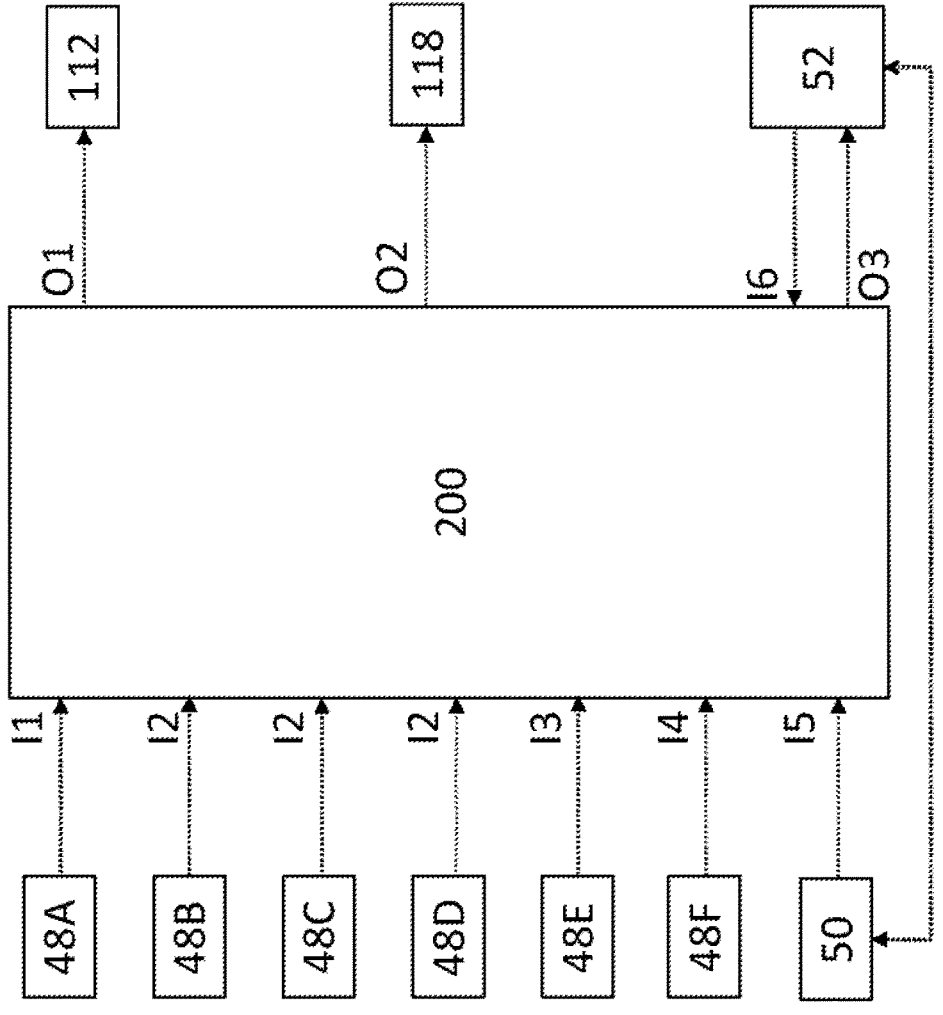
FIG. 4 is schematic overview of a control system for the working vehicle of FIGS. 1 and 2, including its associated inputs and outputs.

FIG. 4 indicates schematically the structure of the control system 200 of the working vehicle 10 and its associated inputs and outputs. As will be described in more detail below, the control system 200 of the illustrated embodiment receives: one or more commands 11 from the user controls 48A; one or more inputs 12 indicative of the extension state of the hydraulic actuators 26, 34, 36; an input 13 indicative of a speed of the working vehicle 10; an input 14 indicative of the inclination of the working vehicle 10; an input 15 indicative of a state of charge of the electric storage device 50; and an input 16 indicative of whether electrical energy is being generated (i.e. whether the traction motor 52 is in a driving state, a regeneration state, or a neutral state).

In the illustrated embodiment, the inputs 12 indicative of extension state of the actuators 26, 34, 36 come from the first, second and third limit switches 48B, 48C, 48D. In alternative embodiments, the inputs 12 come from one or more different sensors (e.g. potentiometers, limit switches and the like). In alternative embodiments, the control system 200 is configured to determine the extension states of the hydraulic actuators 26, 34, 36 based on a history of commands 11 from the user controls 48A.

In the illustrated embodiment, the input 13 indicative of the speed of the working vehicle 10 comes from the speed sensor 48E.

In the illustrated embodiment, the input 14 indicative of the inclination angle of the working vehicle 10 comes from the inclination sensor 48F. In alternative embodiments, the inclination sensor 48F is omitted, and the control system 200 determines inclination via alternative means or does not consider inclination of the working vehicle 10 in its decision logic.

In the illustrated embodiment, the input 15 indicative of a state of charge of the electric storage device 50 comes from the electric storage device 50 itself (e.g. from a sensor on the electric storage device 50). In alternative embodiments, the control system 200 is configured to determine a state of charge of the electric storage device 50 by alternative means (e.g. by tracking outputs sent to the traction motor 52 and load motor 112 and any other electrically-actuated devices).

In the illustrated embodiment, the input 16 indicative of whether electrical energy is being generated comes from the traction motor 52 (e.g. a sensor coupled to the traction motor 52 to determine a voltage and/or current along an electrical path from the traction motor 52). In alternative embodiments, the control system 200 determines whether electrical energy is being generated based on a history of commands 11 from the user controls 48A and/or input 14 indicative of the inclination of the working vehicle 10. In such embodiments, the determination may be based solely on the history of commands 11 and/or input 14, or may instead be based on a combination of the history of commands 11, input 14 and/or input 16 from the traction motor 52.

The control system 200 sets an output O1 to the load motor 112 for controlling output of fluid from the hydraulic pump 110.

In the illustrated embodiment, the control system 200 also sets output O2 directly to the directional control valve block 118 to set a state of the valves therein. In alternative embodiments, the directional control valve block 118 is controlled by a flow of pilot fluid, and the control system 200 sets outputs to one or more pilot control valves to set a state of the directional control valves 118.

In the illustrated embodiment, the control system 200 also sets an output O3 to the traction motor 52 for controlling movement of the wheels 14. In alternative embodiments, the output O3 is omitted (e.g. the traction motor 52 is directly connected to the user controls 48A, or is connected via an alternative control system).

It will be understood that the control system 200 may include a variety of other standard inputs and outputs (not shown) for correct functioning of the working vehicle 10.

It will be understood that the electrical energy generated by the traction motor 52 in the regenerative braking state is transferred to the electric storage device 50 (i.e. to charge the electric storage device 50) and/or is consumed by the load motor 112 and/or other electrical components of the working vehicle 10. Accordingly, if more electrical energy is generated by the traction motor 52 than is consumed by the load motor 112 and other electrical components of the working vehicle 10, then the electrical energy generated by the traction motor 52 will charge the electric storage device 50.

When it is determined that an amount of charge in the electric storage device 50 is at or above a predetermined threshold, the control system 200 is configured to induce additional load on the hydraulic system by directing the load motor 112 to drive the hydraulic pump 110 and actuating the directional control valves 118 to direct flow of hydraulic fluid from the hydraulic pump 110 to one or more of the hydraulic actuators 26, 34, 36.

By dissipating excess electrical energy generated by the traction motor 52 through the existing hydraulic system 100, the electric storage device 50 is prevented from overcharging (e.g. reaching an amount of charge greater than said predetermined threshold) which could lead to damage of the electric storage device 50.

In addition, by configuring the control system 200 to dissipate excess electrical energy via one or more of the hydraulic circuits associated with the hydraulic actuators 26, 34, 36, hydraulic pump 110 and valves 116, 118, power can be dissipated in an existing hydraulic system architecture 100 without a need for any additional power dissipating components (e.g. separate electrical energy dissipation circuits with corresponding diverting valves). However, in alternative embodiments electrical energy is dissipated through pressure relief valve 124 by blocking (i.e. "dead-heading") the valves of the directional control valve block 118.

Figure 5:
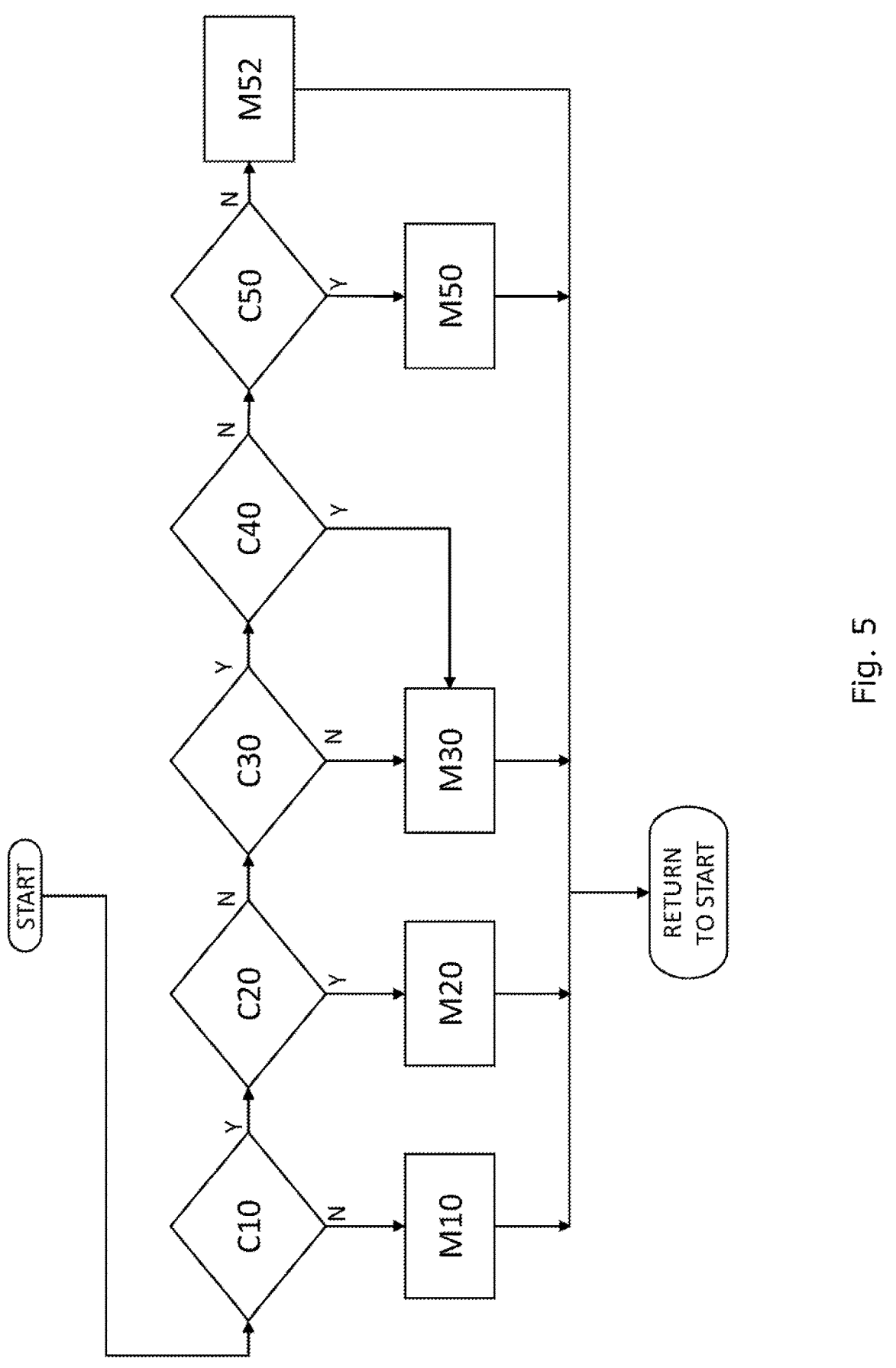
FIG. 5 is a flow chart for the control system of FIG. 4.

In more detail, FIG. 5 outlines a process flow chart of the control system 200. While the process flow chart shows checks C10 to C50 carried out in a particular order, it will be understood that any logical order of checks and operating modes disclosed below may be used.

A check C10 is carried out to determine an extension state of the hydraulic actuators 26, 34, 36. If it is determined that the hydraulic actuators 26, 34, 36 are not in a fully retracted state, the control system 200 operates in mode M10, which involves restricting a drive speed of the working vehicle 10 and/or limiting travel of the working vehicle 10 to slopes of 10 degrees or less, (e.g. to slopes of 5 degrees or less). In this restricted operating mode M10, the conditions which lead to substantial electrical energy being generated by the traction motor 52 (i.e. heavy braking conditions) are avoided, and therefore overcharging of the electric storage device 50 is inhibited. However, the hydraulic actuators 26, 34, 36 can be moved as normal (e.g. as directed by user inputs 48A).

Restricting drive speed of the working vehicle 10 can be accomplished via any conventional means (e.g. a feedback loop involving input signals from the speed sensor 48E and outputs to the traction motor 52 and/or a mechanical brake). Similarly, limiting travelling of the working vehicle 10 to slopes of 10 degrees or less can be accomplished via any conventional means (e.g. a control logic including input signals from the inclination sensor 48F and outputs to the traction motor 52 and/or a mechanical brake).

In the illustrated embodiment, as mode M10 avoids conditions in which substantial electrical energy is generated by the traction motor 52, no further checks described below are carried out until it is determined at check C10 that the hydraulic actuators 26, 34, 36 are in a fully retracted state.

If it is determined at C10 that the hydraulic actuators 26, 34, 36 are fully retracted, a check C20 is carried out to determine whether a state of charge of the electric storage device 50 is at or above a predetermined overcharge threshold (e.g. a predetermined threshold indicative of a "critically overcharged" state of the electric storage device 50). If it is determined that an amount of charge in the electric storage device 50 is at or above the predetermined overcharge threshold, the control system 200 operates in mode M20, which involves preventing movement of the working vehicle 10 (e.g. by applying a parking brake and/or disabling traction motor 52). In this way, the electric storage device 50 is protected from damage associated with overcharging. It will be understood that in such a situation the operator would be required to move one or more actuators 26, 34, 36 and/or hydraulic fluid would have to be directed to a fully retracted/ extended hydraulic actuator 26, 34, 36 to dissipate electrical energy from the electric storage device 50 until the charge drops below the predetermined overcharge threshold, before the working vehicle 10 can be driven again.

If it is determined at C20 that an amount of charge in the electric storage device 50 is below the predetermined overcharge threshold, a check C30 is carried out to determine if electrical energy is being generated by the traction motor 52. If it is determined that no electrical energy is being generated by the traction motor 52, the control system 200 operates in mode M30 in which the working vehicle 10 operates as normal (i.e. according to user controls 48A).

If it is determined at C30 that electrical energy is being generated by the traction motor 52, a check C40 is carried out to determine whether a user is requesting to move any of the actuators 26, 34, 36 (i.e. by actuation of the user controls 48A). If it is determined that the user is requesting to move one or more actuators 26, 34, 36, the control system 200 operates in mode M30 in which the working vehicle 10 operates as normal. In this case, because the user is requesting to move one or more actuators 26, 34, 36, actions taken by the control system 200 include: setting the directional control valves 118 to a suitable state to move the actuators 34, 34, 36 as requested; and setting a speed of the load motor 112 so that the hydraulic pump 110 supplies a suitable flow rate of hydraulic fluid to move the actuators 34, 34, 36 as requested. Typically, when a user is controlling the actuators 26, 34, 36 (i.e. moving the basket 20) the working vehicle 10 would be stationary and no electrical energy would be generated by the traction motor 52. In any case, if excess electrical energy is generated (i.e. when the electric storage device 50 is fully-charged) while the user is moving the basket 20, this electrical energy will be dissipated in the hydraulic system 100 as one or more of the actuators 26, 34, 36 are moved.

If it is determined at C40 that a user is not requesting to move any of the actuators 26, 34, 36, a check C50 is carried out to determine whether a state of charge of the electric storage device 50 is at or above a predetermined full-charge threshold (i.e. a threshold indicative of a "fully-charged" state of the electric storage device 50). In some embodiments, the full-charge threshold is set to an amount less than full capacity to provide a buffer for avoiding overcharging (e.g. 90% of maximum capacity of the electric storage device 50). In any case, it will be understood that the predetermined full-charge threshold is less than the predetermined overcharge threshold of check C20. If it is determined that an amount of charge in the electric storage device 50 is less than the predetermined full-charge threshold, the control system 200 operates in mode M50, in which electrical energy generated by the traction motor 52 is used to recharge the electric storage device 50.

If it is determined at check C50 that an amount of charge in the electric storage device 50 is at or above the predetermined full-charge threshold, the control system 200 operates in mode M52, which involves: determining which of the fully retracted hydraulic actuators 26, 34, 36 has the highest predefined pressure setting; inducing an additional load on the hydraulic system by directing electrical energy from the traction motor 52 to the load motor 112 to drive the hydraulic pump 110; and actuating the directional control valve 118 associated with the fully retracted actuator 26, 34, 36 having the highest predefined pressure setting to direct hydraulic fluid from the hydraulic pump 110 to urge said hydraulic actuator 26, 34, 36 in a retracting direction. Dissipating electrical energy in the actuator 26, 34, 36 with the highest predefined pressure setting maximizes the amount of electrical energy which can be dissipated.

In alternative embodiments, excess electrical energy from the traction motor 52 can alternatively or additionally be dissipated in one of the actuators 26, 34, 36 when it is in a fully extended state (i.e. by actuating the directional control valve 118 associated with a fully-extended actuator 26, 34, 36 to direct hydraulic fluid from the hydraulic pump 110 to urge said hydraulic actuator 26, 34, 36 in an extending direction).

It will be understood that each of the hydraulic actuators 26, 34, 36 will be mechanically prevented from retracting beyond a fully retracted state and from extending beyond a fully extended state. Therefore, when hydraulic fluid is directed to urge a fully retracted hydraulic actuator 26, 34, 36 in a retracting direction (or a fully extended hydraulic actuator 26, 34, 36 in an extending direction), movement of the hydraulic actuator 26, 34, 36 is mechanically prevented, which results in the pressure of hydraulic fluid being supplied to the hydraulic actuator 26, 34, 36 increasing. This increase in pressure leads to an increase in temperature, which dissipates the excess electrical energy generated by the traction motor 52 as waste heat.

Furthermore, by urging a fully retracted hydraulic actuator 26, 34, 36 in a retracting direction (or a fully extended actuator 26, 34, 36 in an extending direction) power dissipation can take place without any unwanted movement of an associated element of the working vehicle 10 which is moved by the hydraulic actuator 26, 34, 36 (e.g. the boom arrangement 22).

In the illustrated embodiment, check C10 is implemented by the control system 200 using signals from the first, second and third limit switches 48B, 48C and 48D. The first limit switch 48B is configured to indicate whether the telescopic main boom 32 is fully retracted (and thus whether the main boom extension actuator 36 is fully retracted). In other words, when the first limit switch 48B is closed, the control system 200 can determine that the main boom extension actuator 36 is fully retracted, and when the first limit switch 48B is open, the control system 200 can determine that the main boom extension actuator 36 is not fully retracted.

The second limit switch 48C is configured to indicate whether the main boom 32 is lowered and thus whether the main boom lifting actuator 34 is fully retracted. In other words, when the second limit switch 48C is closed, the control system 200 can determine that the main boom lifting actuator 34 is fully retracted, and when the second limit switch 48C is open, the control system 200 can determine that the main boom lifting actuator 34 is not fully retracted.

The third limit switch 48D is configured to indicate whether the articulated boom arrangement 24 is lowered and thus whether the articulated boom lifting actuator 26 is fully retracted. In other words, when the third limit switch 48D is closed, the control system 200 can determine that the articulated boom lifting actuator 26 is fully retracted, and when the third limit switch 48D is open, the control system 200 can determine that the articulated boom lifting actuator 26 is not fully retracted.

In alternative embodiments, the third limit switch 48D is omitted and the second limit switch 48C is configured to indicate whether all of the articulated boom arrangement 24, main boom 32 and respective lifting actuators 26, 34 are fully retracted. In such embodiments, when the second limit switch 48C is closed, the control system 200 can determine that each of the lifting actuators 26, 34 are fully retracted, and when the second limit switch 48C is open, the control system 200 can determine that one or more of the lifting actuators 26, 34 are not fully retracted.

In alternative embodiments, alternative types of sensors are provided to indicate the position of the hydraulic actuators 26, 34, 36 (e.g. potentiometers, encoders and the like), and the control system 200 is configured to determine the extension state of the hydraulic actuators 26, 34, 36 based on signals from said alternative sensors.

In alternative embodiments, check C10 is implemented by the control system 200 based on a history of user inputs (i.e. inputs from user controls 48A) for controlling the hydraulic actuators 26, 34, 36, which removes the need for dedicated sensors.

It will be understood that the description of the control system 200 above discloses a method of controlling electrical energy in the electric or hybrid working vehicle 10. The method includes the steps of:

determining a state of charge of the electric storage device 50;

b) generating electrical energy by the traction motor 52 and c) inducing additional load on the hydraulic system by directing the load motor 112 to drive the hydraulic pump 110 and directing the directional control valves 118 to permit flow of hydraulic fluid from the hydraulic pump 110 to a hydraulic actuator 26, 34, 36 of the working vehicle when it is determined that an amount of charge in the electric storage device 50 is at or above the predetermined threshold.

Specific details of the method will be apparent from the description of the control system 200 outlined above.

Although the disclosure has been described with reference to one or more embodiments, it will be understood that various changes or modifications can be made without departing from the scope of the disclosure as defined in the appended claims.

It should also be noted that whilst the appended claims set out particular combinations of features described above, the scope of the present disclosure is not limited to the particular combinations hereafter claimed, but instead extends to encompass any combination of features herein disclosed.

The invention claimed is:

1. A method of controlling electrical energy in a working vehicle, the working vehicle comprising: an electric storage device; a traction motor having a driving state, in which the traction motor is configured to propel the working vehicle using power from the electric storage device, and a regenerative braking state, in which the traction motor is configured to perform regenerative braking and generate electrical energy; a hydraulic system comprising a hydraulic pump, a hydraulic actuator and a control valve for controlling flow of hydraulic fluid between the hydraulic pump and the hydraulic actuator; and a load motor configured to drive the hydraulic pump, the method comprising:

determining a state of charge of an electric storage device of the working vehicle;

generating electrical energy by a traction motor of the working vehicle;

inducing additional load on the hydraulic system by directing a load motor of the working vehicle to drive a hydraulic pump of the working vehicle and directing a control valve of the working vehicle to permit flow of hydraulic fluid from the hydraulic pump to a hydraulic actuator of the working vehicle when it is determined that an amount of charge in the electric storage device is at or above a predetermined threshold; and determining an extension state of the hydraulic actuator, such that:

when it is determined that the amount of charge in the electric storage device is at or above the predetermined threshold and that the hydraulic actuator is fully extended, the load motor is directed to drive the hydraulic pump and the control valve is actuated to direct hydraulic fluid from the hydraulic pump to urge the hydraulic actuator in an extending direction; and/or when it is determined that the amount of charge in the electric storage device is at or above the predetermined threshold and that the hydraulic actuator is fully retracted, the load motor is directed to drive the hydraulic pump and the control valve is actuated to direct hydraulic fluid from the hydraulic pump to urge the hydraulic actuator in a retracting direction.

2. The method according to claim 1, wherein the working vehicle comprises two or more hydraulic actuators and two or more control valves for controlling flow of hydraulic fluid between the hydraulic pump and the two or more hydraulic actuators, wherein the two or more hydraulic actuators include the hydraulic actuator and the two or more control valves include the control valve, the method further comprising determining the extension state of each of the hydraulic actuators and, when it is determined that the amount of charge in the electric storage device is at or above the predetermined threshold and that at least one of the hydraulic actuators is in a fully extended or fully retracted state, actuating the two or more control valves to direct hydraulic fluid to said fully extended or fully retracted hydraulic actuator(s).

3. The method according to claim 2, wherein the working vehicle comprises one or more sensors to indicate the position of the two or more hydraulic actuators, and wherein the extension state of each of the hydraulic actuators is determined based on one or more signals from the one or more sensors.

4. The method according to claim 2, wherein the extension state of each of the two or more hydraulic actuators is determined based on a history of inputs for controlling the two or more hydraulic actuators.

5. The method according to claim 2, wherein each of the two or more hydraulic actuators has a predefined pressure setting, wherein when it is determined that the amount of charge in the electric storage device is at or above the predetermined threshold and that more than one hydraulic actuator is in the fully retracted or extended state, the method further comprises selecting the fully retracted or extended actuator with the highest predefined pressure setting for dissipating electrical energy.

6. The method according to claim 2, wherein when it is determined that none of the two or more hydraulic actuators is in the fully extended or retracted state, the method further comprises inhibiting the regenerative braking state of the traction motor.

7. The method according to claim 6, wherein the regenerative braking state of the traction motor is inhibited by restricting a drive speed of the working vehicle and/or by limiting travel of the working vehicle to slopes of 10 degrees or less.

8. The method according to claim 1, wherein the predetermined threshold is a full-charge threshold and wherein when it is determined that the amount of charge in the electric storage device is above a predetermined overcharge threshold greater than the predetermined full-charge threshold, the method further comprises preventing movement of the working vehicle.

9. The method according to claim 1, wherein the hydraulic system further comprises a hydraulic fluid reservoir and a pressure relief valve coupled to the hydraulic actuator, wherein the pressure relief valve is arranged to connect the hydraulic actuator to the hydraulic fluid reservoir when a pressure of the hydraulic actuator exceeds a threshold pressure of the pressure relief valve.

10. The method according to claim 1, wherein the control valve comprises a directional control valve.

11. The method according to claim 1, wherein the hydraulic system comprises two or more hydraulic actuators and two or more valves for controlling flow of hydraulic fluid between the hydraulic pump and the two or more hydraulic actuators, wherein the two or more hydraulic actuators include the hydraulic actuator and two or more control valves include the control valve, wherein the two or more valves comprise a diverter valve, wherein the diverter valve is moveable between a bypass state in which the hydraulic pump is directly connected to the hydraulic fluid reservoir and an actuating state in which the hydraulic pump can be connected to the two or more hydraulic actuators, wherein the hydraulic system is configured such that when one of the hydraulic actuators is to be actuated and/or excess electrical energy is to be dissipated, the diverter valve is set to the actuating state, and such that when no hydraulic actuator is to be actuated and no excess electrical energy is to be dissipated, the diverter valve is set to the bypass state, and wherein a pressure relief valve is located between the diverter valve and the two or more hydraulic actuators.

12. The method according to claim 1, wherein the working vehicle is a mobile elevated work platform comprising a chassis and a basket coupled to the chassis by a boom arrangement, wherein the hydraulic system comprises two or more hydraulic actuators and wherein a position of the boom arrangement and/or basket is controlled by the two or more hydraulic actuators; and wherein the two or more hydraulic actuators include the hydraulic actuator, wherein the two or more hydraulic actuators comprise a lifting actuator configured to raise the vertical height of the boom arrangement and/or an extending actuator configured to alter the length of the boom arrangement.

13. The method according to claim 12, wherein the boom arrangement comprises an articulated boom arrangement coupled to the chassis, and wherein the two or more hydraulic actuators comprise an articulated boom lifting actuator for altering a vertical height of the articulated boom arrangement.

14. The method according to claim 13, wherein the boom arrangement comprises a main boom pivotally coupled to the articulated boom arrangement, and wherein the two or more hydraulic actuators further comprise a main boom lifting actuator for altering an angle of the main boom relative to the articulated boom arrangement.

15. The method according to claim 14, wherein the main boom is telescopic, and wherein the two or more hydraulic actuators comprise an extending actuator for extending/retracting the telescopic main boom.

16. The method according to claim 15, wherein the working vehicle comprises a first limit switch configured to indicate whether the telescopic main boom and/or extending actuator are fully retracted, wherein the working vehicle comprises a second limit switch configured to indicate whether the articulated boom arrangement, main boom and/or respective lifting actuators are fully retracted, wherein the second limit switch is configured to indicate whether the articulated boom arrangement and/or the articulated boom lifting actuator are fully retracted and the working vehicle comprises a third limit switch configured to indicate whether the main boom and/or the main boom lifting actuator are fully retracted, and wherein when it is determined that the amount of charge in the electric storage device is at or above the predetermined threshold and when at least one limit switch indicates that the respective actuator is not fully retracted, the method further comprises restricting a drive speed of the working vehicle and/or limiting travelling of the working vehicle to slopes of 10 degrees or less.

17. The method according to claim 14, wherein the boom arrangement comprises a jib boom arrangement coupled to the main boom at a first end of the jib boom arrangement and to the basket at a second end of the jib boom arrangement, and wherein the two or more hydraulic actuators further comprise a levelling actuator for pivoting the jib boom arrangement with respect to the main boom to level the basket.

* * * * *